US007165362B2

(12) United States Patent
Jobs et al.

(10) Patent No.: US 7,165,362 B2
(45) Date of Patent: Jan. 23, 2007

(54) GLASS SUPPORT MEMBER

(75) Inventors: Steve Jobs, Palo Alto, CA (US); Karl Backus, Emeryville, CA (US); Rosa Sheng, Emeryville, CA (US); Ben McDonald, San Francisco, CA (US); Michael Waltner, Berkeley, CA (US); Colleen Caulliez, San Francisco, CA (US); James O'Callaghan, New York, NY (US); Graham Coult, London (GB); Damian Rogan, New York, NY (US); Scott Nelson, Cirencester (GB)

(73) Assignee: Apple Computer, Inc., Cupertino, CA (US)

( * ) Notice: Subject to any disclaimer, the term of this patent is extended or adjusted under 35 U.S.C. 154(b) by 375 days.

(21) Appl. No.: 10/616,065

(22) Filed: Jul. 8, 2003

(65) Prior Publication Data

US 2004/0006939 A1    Jan. 15, 2004

Related U.S. Application Data

(60) Provisional application No. 60/396,306, filed on Jul. 15, 2002.

(51) Int. Cl.
*E04F 11/00*    (2006.01)
*E04F 19/10*    (2006.01)

(52) U.S. Cl. .......................................... 52/188; 52/179
(58) Field of Classification Search ................ 52/182, 52/179, 185, 188, 191, 187
See application file for complete search history.

(56) References Cited

U.S. PATENT DOCUMENTS

| 3,658,636 | A | * | 4/1972 | Beckmann et al. | 428/437 |
| 3,706,170 | A | * | 12/1972 | Argraves et al. | 52/189 |
| 4,873,802 | A | * | 10/1989 | Dahowski | 52/184 |
| 5,022,197 | A | | 6/1991 | Aragona | |
| 5,349,795 | A | * | 9/1994 | French et al. | 52/183 |
| 5,400,556 | A | * | 3/1995 | Favaron | 52/182 |
| D371,581 | S | | 7/1996 | Järnros | |
| 5,636,483 | A | * | 6/1997 | Wille | 52/188 |
| D389,588 | S | | 1/1998 | Dunk | |
| 5,794,391 | A | * | 8/1998 | Howard | 52/182 |
| D398,063 | S | | 9/1998 | Kline | |
| D399,975 | S | | 10/1998 | Confer | |
| D415,289 | S | | 10/1999 | Dalton | |
| 5,960,516 | A | | 10/1999 | Zoroufy et al. | |
| D417,736 | S | | 12/1999 | Cavaness | |
| D423,079 | S | | 4/2000 | Blount | |
| 6,059,269 | A | | 5/2000 | Ross | |
| D428,629 | S | | 7/2000 | Cohen | |

(Continued)

OTHER PUBLICATIONS

"Glass Stairs System Examples", Feb. 6, 2003, glassstairs.com.*

*Primary Examiner*—Naoko Slack
*Assistant Examiner*—Chi Q. Nguyen
(74) *Attorney, Agent, or Firm*—Beyer Weaver & Thomas, LLP

(57) ABSTRACT

A monolithic glass member for supporting loads is disclosed. The glass member includes a plurality of glass sheets that are laminated together with one or more bonding layers. One of the glass sheets has a cut out at an edge thereof to receive a connector. The connector provides a means for connecting and supporting the glass member relative to other structures.

27 Claims, 12 Drawing Sheets

U.S. PATENT DOCUMENTS

| | | |
|---|---|---|
| D431,303 S | 9/2000 | Maiuccoro |
| 6,176,027 B1 | 1/2001 | Blount |
| 6,205,722 B1 * | 3/2001 | Bromley et al. ............... 52/182 |
| D478,999 S | 8/2003 | Jobs et al. |
| 6,675,550 B1 * | 1/2004 | Dlubak .................... 52/786.11 |

* cited by examiner

GLASS SUPPORT MEMBER

CROSS REFERENCE TO RELATED APPLICATION

This application claims the benefit of U.S. Provisional Application No. 60/396,306, filed on Jul. 15, 2002, entitled "Glass Support Member", in which the disclosure is incorporated herein by reference.

FIELD OF THE INVENTION

The present invention relates generally to glass structures. More particularly, the present invention relates to glass members for supporting loads.

BACKGROUND OF THE INVENTION

Glass structures such as stairs, floors and bridges have been around for some time. Each of these structures typically includes a glass member for supporting loads from foot traffic. For example, stairs may include glass treads, risers or landings, and floors and bridges may include glass platforms. Because of the structural requirements for supporting these types of loads, the glass members are typically formed from a laminate structure that includes various layers of glass and bonding materials. The laminate structure is much stronger than any one layer by itself and thus it can support heavier loads such as those caused by foot traffic. In recent years, the layers of glass have been bonded together with polyvinyl butyral (PVB), i.e., a layer of PVB is disposed between two glass layers. For long spans, however, the laminate structure typically has to be supported in the middle of the span to prevent deflection thereof when loads are applied thereto. For example, a steel beam may be positioned at the middle of the laminate structure to prevent deflections. Although such arrangements work well, there are continuing efforts to improve laminate structures so as to provide glass members that are more aesthetically pleasing and that can support larger loads over longer spans without the use of a middle support structure.

SUMMARY OF THE INVENTION

The invention relates, in one embodiment, to a monolithic glass member for supporting loads. The glass member includes a plurality of glass sheets. One of the glass sheets has a cut out at an edge thereof. The glass member also includes a connector disposed in the cut out of the one glass sheet. A portion of the connector is exposed at the edge of the glass member. The connector provides a means for connecting and supporting the glass member relative to other structures. The glass member also includes a bonding layer disposed between adjacent pairs of glass sheets. The bonding layer is configured to bond the glass sheets and the connector together to form a laminated structure and to provide rigidity and stiffness to the laminated structure.

The invention relates, in another embodiment, to a glass support member. The glass support member includes a plurality of glass sheets that are bonded together via one or more Sentry Glas Plus Ionplast Interlayers to form a laminate structure. The laminated structure has a top surface, a bottom surface and an edge formed therebetween. The laminate structure is configured to be secured only at the edge and to support human loads that are applied normal to the top surface.

The invention relates, in another embodiment, to a glass laminate structure. The glass laminate structure includes a titanium insert disposed within the bonded glass layers of the glass laminate structure. The titanium insert is positioned at the edge of the glass laminate structure so as to allow the glass laminate structure to be connected to other structures.

The invention relates, in another embodiment, to a staircase. The stair case includes a pair of spaced apart vertical walls. The stair case also includes a plurality of horizontal glass treads positioned between the spaced apart vertical walls in a stepped apart relationship relative to one another. Each of the glass treads has opposing ends. The stair case further includes a plurality of connection arrangements for fixing the opposing ends of the horizontal glass treads to the spaced apart vertical walls. Each of the connection arrangements includes a first connection member that is adapted to be fixed to the vertical wall and a second connection member adapted to be fixed to the end of the glass horizontal tread. The first connection member has a first interlocking portion, and the second connection member has a second interlocking portion. The first and second interlocking portions are configured to engage one another so as to place the horizontal glass tread in a secure relationship relative to the vertical walls.

The invention relates, in another embodiment, to a apparatus for affixing an end of a glass stair to a support structure. The apparatus includes a first connection member adapted to be fixed to the support structure. The first connection member has a first interlocking portion. The apparatus also includes a second connection member adapted to be fixed to the end of the glass stair. The second connection member has a second interlocking portion. The first and second interlocking portions are configured to engage one another so as to place the glass stair in a secured relationship relative to the support structure.

BRIEF DESCRIPTION OF THE DRAWINGS

The invention may best be understood by reference to the following description taken in conjunction with the accompanying drawings in which.

DETAILED DESCRIPTION OF THE INVENTION

The invention generally pertains to glass structures. More particularly, the invention pertains to an improved glass member configured to support loads, as for example from people walking thereon. The glass member includes a plurality of glass layers that have been bonded together to form a monolithic member. One aspect of the glass member corresponds to the bonding agent used to bond the layers of glass together. The bonding agent is generally configured to provide added stiffness to the glass member so that the glass member can span longer distances using only connection points at the edge of the span (rather than using additional supports in the middle of the span). Another aspect of the glass member corresponds to structural connectors that are integrated into the glass member, i.e., part of the monolithic member. The structural connectors allow the glass member to be connected to other structures. The glass member is particularly useful as a stair (treads and/or risers) or landing in a glass staircase.

Embodiments of the invention are discussed below with reference to FIGS. 1–12. However, those skilled in the art will readily appreciate that the detailed description given herein with respect to these figures is for explanatory purposes as the invention extends beyond these limited embodiments.

Figure 1:
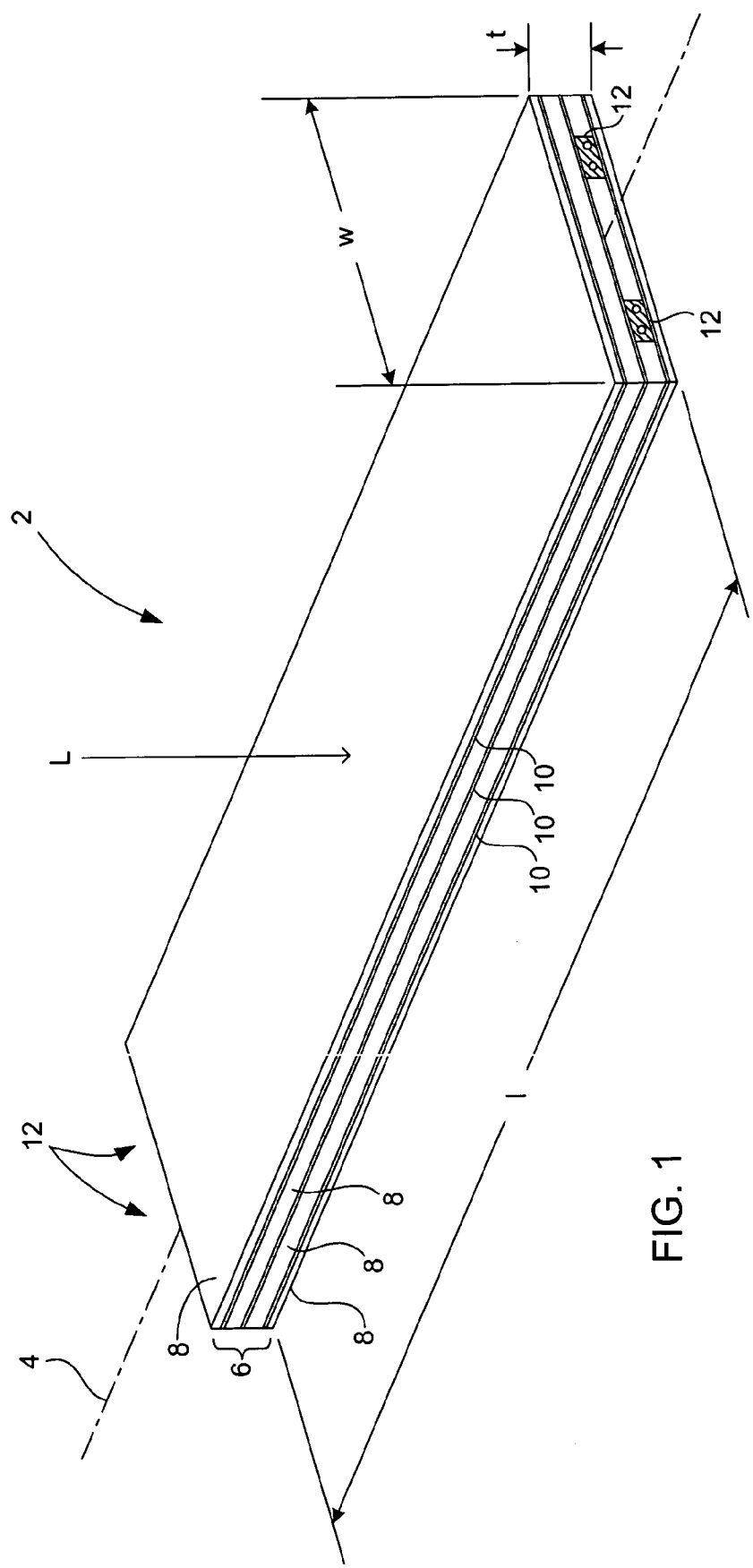
FIG. 1 is a perspective diagram of a glass member, in accordance with one embodiment of the present invention.

FIG. 1 is perspective diagram of a glass member 2, in accordance with one embodiment of the present invention. The glass member 2 is a structural member configured to support loads, as for example load L which is directed normal to the axis 4 of the glass member 2. By way of example, the glass member 2 may be used as a glass stair (whether a tread or riser or both), a glass landing, a glass bridge, a glass floor, a glass beam, a glass wall and the like. As shown, the glass member 2 is a clear laminate structure 6 formed by a plurality of layers. The laminated structure 6 generally consists of glass sheets 8, bonding layers 10 and inserts 12. The glass sheets 8 are configured to be the main load bearing elements of the glass member 2. The inserts 12 are configured to provide a means for connecting the glass member 2 to other structures. The inserts 12 are generally located at the sides of the glass member 2 in a cutout or void at the edge of at least one of the glass sheets 8, i.e., the inserts 12 do not extend through the glass sheets 8. The bonding layers 10, each of which is disposed between each of the glass sheets 8, is configured to bond the glass sheets 8, as well as the inserts 12, together to form the laminated structure 6 and to provide rigidity and stiffness to the laminated structure 6. In essence, the bonding layers 10 help to produce a monolithic glass member out of multiple glass sheets 8 and inserts 12. As should be appreciated, the combination of the various layers forms a single glass member that is stronger than each of the individual layers taken alone. The glass member 2 can therefore be used to support heavier loads over larger spans without the use of support structures in the middle of the span, as for example, in the location of load L.

The number, location and configuration of each of the various layers may be widely varied. The number, location and configuration generally depends on many factors, including but not limited to, the overall size of the glass member 2 (e.g., length L, width W and thickness t), the overall load bearing capacity of the glass member 2, the overall look of the glass member 2 (aesthetics) and the like. With regards to number, the laminate structure 6 may consist of two or more glass sheets 8, one or more bonding layers 10, one or more inserts 12, and the like. In most cases, there is one less bonding layer 10 than there are glass sheets 8 since the bonding layer 10 is disposed between the glass sheets 8. For example, if three glass sheets are used then there are typically two bonding layers, and if five glass sheets are used then there are typically four bonding layers. Furthermore, the number of inserts generally varies according to the width of the glass member. In the illustrated embodiment, the laminate structure 6 includes four glass sheets 8, three bonding layers 10, and four inserts 12 (two on each side of the glass member 2)

With regards to configuration, each of the layers may be formed with various sizes, shapes, and the like. For example, each of the layers may have the same thickness or a different thickness than the other layers in the structure. In the illustrated embodiment, the top and bottom glass sheets 8 have a thickness that is similar, but smaller than the thickness of the two intermediate glass sheets 8 (which also have a similar thickness) disposed therebetween. In most cases, the inserts 12 have the same thickness as the glass sheet 8 that has the void in which the insert is disposed. Furthermore, each of the layers may be formed with various materials. By way of example, each particular type of layer may be formed from the same or different material. For example, any suitable glass material may be used for the glass sheets 8 (e.g., tempered glass, annealed glass, and the like). In a similar manner, any suitable bonding material may be used for the bonding layer 10 (e.g., polymers such as Bucite and/or SentryGlas Plus, each of which is manufactured by Dupont of Wilmington, Del.). Also, any suitable structural material may be used for the inserts 12 (e.g., metals such as steel, aluminum, titanium, etc.). In the illustrated embodiment, the glass sheets 8 are formed from annealed glass, the bonding layers 10 are formed from SentryGlas Plus interlayer, and the inserts 12 are formed from titanium.

With regards to location, the position of each of the various layers may vary according to the specific needs of each glass member 2. For example, the position of glass sheets 8 with different thickness and material types may vary through the thickness of the laminate structure 6. In particular, the glass sheets 8 may be positioned symmetrically from the axis 4 (as shown—thin first sheet, thick second sheet, thick third sheet, thin fourth sheet) or asymmetrically from the axis 4 (thin first sheet, thick second sheet, thin third sheet, thick fourth sheet). Furthermore, the inserts 12 may be located at any side of the glass member 2. That is, although they are shown at particular sides of the glass member 2, they may be disposed at the other sides as well (in addition to or alternatively). Moreover, the inserts 12 may be located within a void defined by a single glass sheet 8 or by multiple glass sheets 8. In the illustrated embodiment, the inserts 12 are located at opposing ends of the glass member 2 within a void of a single glass sheet 8 (the third glass sheet).

Figure 2:
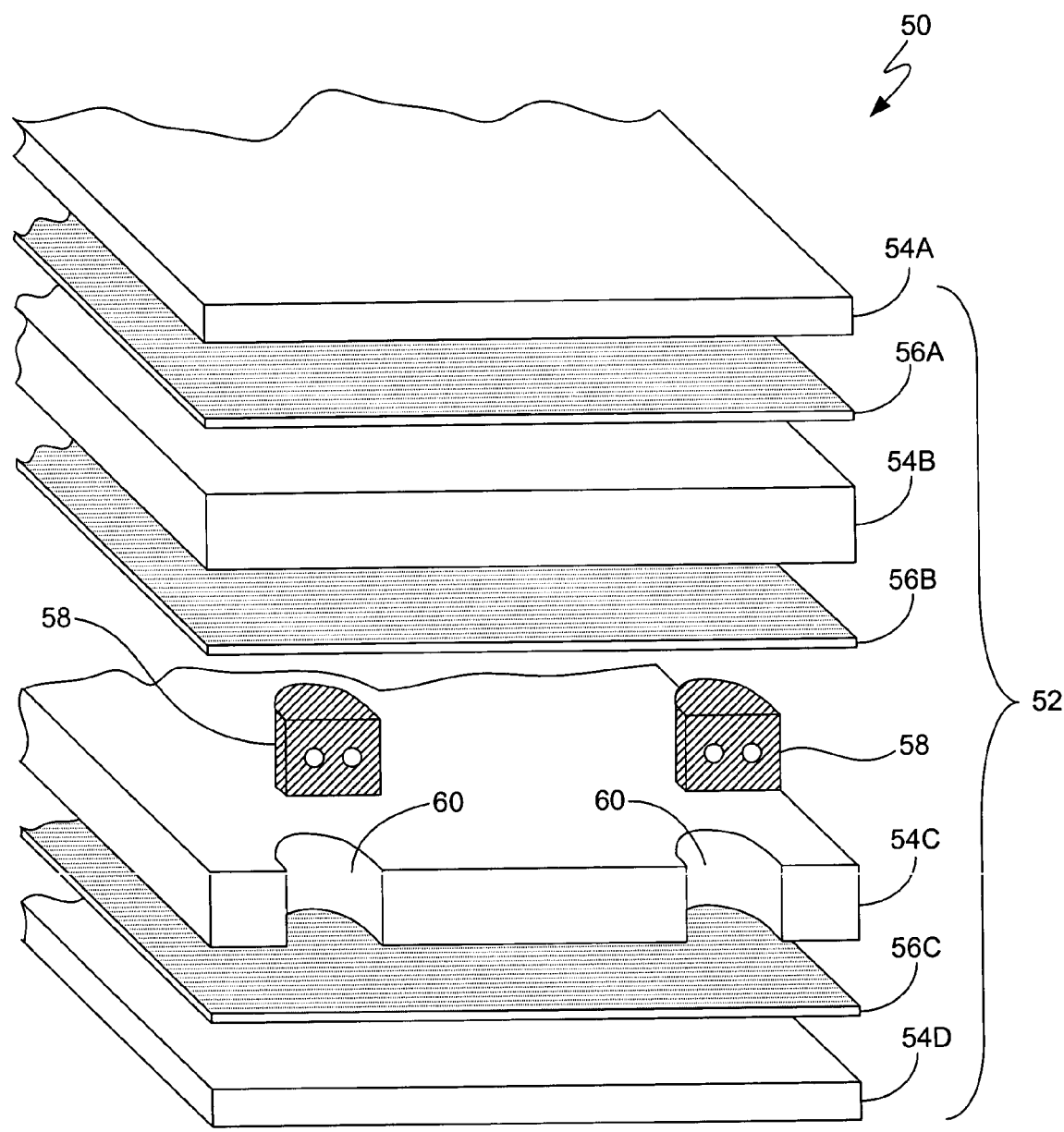
FIG. 2 is a broken apart perspective diagram of an end of a glass member, in accordance with one embodiment of the present invention.

FIG. 2 is a broken apart perspective diagram of an end of a glass member 50, in accordance with one embodiment of the present invention. The glass member 50 is generally configured to support loads thereon. By way of example, the glass member 50 may generally correspond to the glass member 2 shown in FIG. 1. The glass member 50 is a clear laminate structure 52 formed by a plurality of layers. By clear, it is generally meant that the glass member 50 is transparent or translucent. As shown, the laminate structure 52 consists of a top glass sheet 54A, a first intermediate glass sheet 54B, a second intermediate glass sheet 54C and a bottom glass sheet 54D. Although not shown, the top glass sheet may have a slip resistant coating applied to its top surface to prevent people from slipping and falling when walking on the glass member. The laminate structure 52 also consists of several bonding layers 56, which are disposed between each of the glass sheets 54. The bonding layers 56 are configured to bond the glass sheets 54 together to form a monolithic part that acts as a single piece of material. In particular, the top glass sheet 54A is bonded to the first intermediate glass sheet 54B via a first bonding film 56A, the first intermediate glass sheet 54B is bonded to the second intermediate glass sheet 54C via a second bonding film 56B and the second intermediate glass sheet 54C is bonded to the bottom glass sheet 54D via a third bonding film 56C.

The laminate structure 52 also includes a pair of inserts 58. The inserts provide a connection point so that the glass member may be secured to another member. For example, it may be connected to a glass panel or some other support structure (does not have to be glass). The inserts 58 are configured for insertion into a pair of voids 60 located at the ends of the second intermediate layer 54C. The voids 60 are generally sized to receive the inserts 58. However, a small gap may be provided between the periphery of the insert 58 and the walls of the void 60 for tolerances. For all intensive purposes, the inserts 58 should be considered to be part of the second intermediate layer. 54C, i.e., they are laminated into the glass member between the first intermediate glass sheet and the bottom glass sheet and more particularly between the bonding films 56B and 56C.

The inserts are generally spaced apart from the front and back edges to prevent cracking and generally spaced apart from each other to increase the overall load bearing capabilities of the glass member. Although a pair of inserts are shown and described, it should be noted that this is not a limitation. For example, a single insert or more than two inserts may be used. It is generally believed that the number of inserts is directly proportional to the width of the glass member, i.e., more inserts are needed for wider glass members. By way of example, the spacing between the centerline of the inserts may be between about 7 and 12 inches (177.8 mm–304.8 mm), and the spacing between the edge of the glass member (front and back) and the centerline of the inserts may be about 2 inches (50.8 mm) or greater—don't want to be too close to the edge due to the fact that it cracks.

The shape of the inserts may be widely varied. For example, they may be square, rectangular, triangle, circle, oval or other more complicated shapes. In the illustrated embodiment, the insert is a semi-circle. It is generally believed that curvilinear shapes such as these prevent cracking. In one embodiment, the radius is slightly flared to further prevent cracking. Although curvilinear shapes are preferred, it should be noted that this is not a limitation and that rectilinear shapes of a combination of curvilinear and rectilinear shapes may be used.

As mentioned previously, the materials of the various layers may be widely varied. However, it has been found that certain materials work better than others. In the illustrated embodiment, each glass sheet is formed with annealed glass. As should be appreciated, annealed glass may be polished after lamination thereby creating a more aesthetically pleasing look (especially at the edge of the laminated glass member). Each glass sheet may also be low iron glass. Low iron generally implies that iron is taken out of the glass. This is generally done to make the glass clearer, i.e., take the green hues out. Low iron glass is typically a challenge to use in structural members since removing iron from glass generally weakens the glass. The weakening is generally overcome by laminating the glass sheets together.

The glass sheets are laminated together via a SentryGlas Plus Ionplast Interlayer (ionomeric extruded polymer) manufactured by Dupont of Wilmington, Del. (or equivalents thereof). The SentryGlas Plus Ionplast Interlayer in between the glass sheets strengthens the laminate structure and holds it together. The SentryGlas Plus Ionplast Interlayer also allows thinner construction than is now possible with conventional laminated glass. The interlayer is configured to provide rigidity to the laminate structure, making the structure a lot stiffer, i.e., the loaded glass member tends to deflect less than if conventional interlayers were used. It is generally believed that SentryGlas Plus Ionplast Interlayer offers about five times the tear strength, optimum durability and is nearly 100 times more rigid than conventional laminated glass interlayers. It is also believed that SentryGlas Plus Ionplast Interlayers provide better flow during formation of the laminate structure. Furthermore, through experimentation and research, it was found that titanium has a similar cooling temperature to that of the annealed glass, and therefore it is preferably used to form the inserts. As should be appreciated, the thermal properties of metals and glass are typically different, and thus the glass ends up cracking when metal inserts are used. Using titanium inserts prevents the laminate structure from cracking at locations around the insert during formation of the laminate structure.

Sentry Plus Interlayer has the following typical properties:

| CHARACTERISTICS | VALUE |
| --- | --- |
| YOUNG'S MODULUS | 43.5 Kpsi |
| TEAR STRENGTH | 604 ft-lb/in3 |
| TENSILE STRENGTH | 5.0 Kpsi |
| ELONGATION | 400% |
| DENSITY | 0.0343 lbs/in3 |
| FLEX MODULUS (73° F.) | 50 Kpsi |
| HDT at 66 psi | 110° F. |
| COEFF. EXPANSION (−20° C. TO 32° C.) | 0.10–0.15 Mils/in |

Sentry Plus Interlayer also has the following laminate properties:

| CHARACTERISTICS | VALUE |
| --- | --- |
| HAZE | <2% |
| ADHESION TO GLASS, CSS | >3000 psi |
| IMPACT TEST, 5PB (2.27 Kg) | >30 Ft. |
| BOIL TEST, 2 HR | No defects |
| BAKE TEST, 2 HR/100° c. | No defects |

Although these properties are shown, it should be appreciated that they are by way of example and not by way of limitation. That is, although Sentry Plus Interlayer is preferred, it should be noted that it is not a limitation and that other types of interlayers may be used. These alternate interlayers may not have the exact values as listed above. For example, they may range within 10% (or more) of the above listed values. Furthermore, they may only have one or more of the properties listed above. As should be appreciated, each of these properties has a different effect on the overall characteristics of the glass member. That is, some may impact the glass member more than others. However, in most cases, the alternate interlayers have a majority of the properties with similar values as listed above in order to serve as a replacement.

The glass member may be formed using a variety of methods. In the illustrated embodiment, the glass member is formed by cutting the voids or cut-out in the second intermediate layer, sandwiching the various layers together in their proper order, and then heating or baking the sandwiched layers. During cutting, the size of the insert is typically measured and the glass is cut according to the measured size (with small tolerances). During heating or baking, the bonding film is configured to melt so that it adheres to the two adjacent glass sheets and so that it flows into any voids or gaps therebetween. For example, the melted material flows into the gaps located around the insert thus filling the gaps between the insert and the glass sheets. Once cooled, the bonding film bonds the glass sheets together and locks the insert into its void therein. In one implementation, the laminate structure is autoclaved, i.e., during heating the air bubbles are removed from the interlayers via vacuum. Furthermore, for aesthetic reasons, the edges of the glass member may be beveled (e.g., 45 degrees) and/or polished.

The length, width and thickness of the glass member may be widely varied. In general, however, the overall thickness, as well as the individual thickness of each of the various layers controls the length of the glass member, which is only supported at its edges (no middle support structures). That is, it is generally believed that as the thickness increases so can the unsupported length of the glass member. In one particular embodiment, for an overall thickness of about 2 inches (50.8 mm), it has been found that an overall length of about 8 feet (2438 mm) or less may be used for the glass member.

Figure 3A:
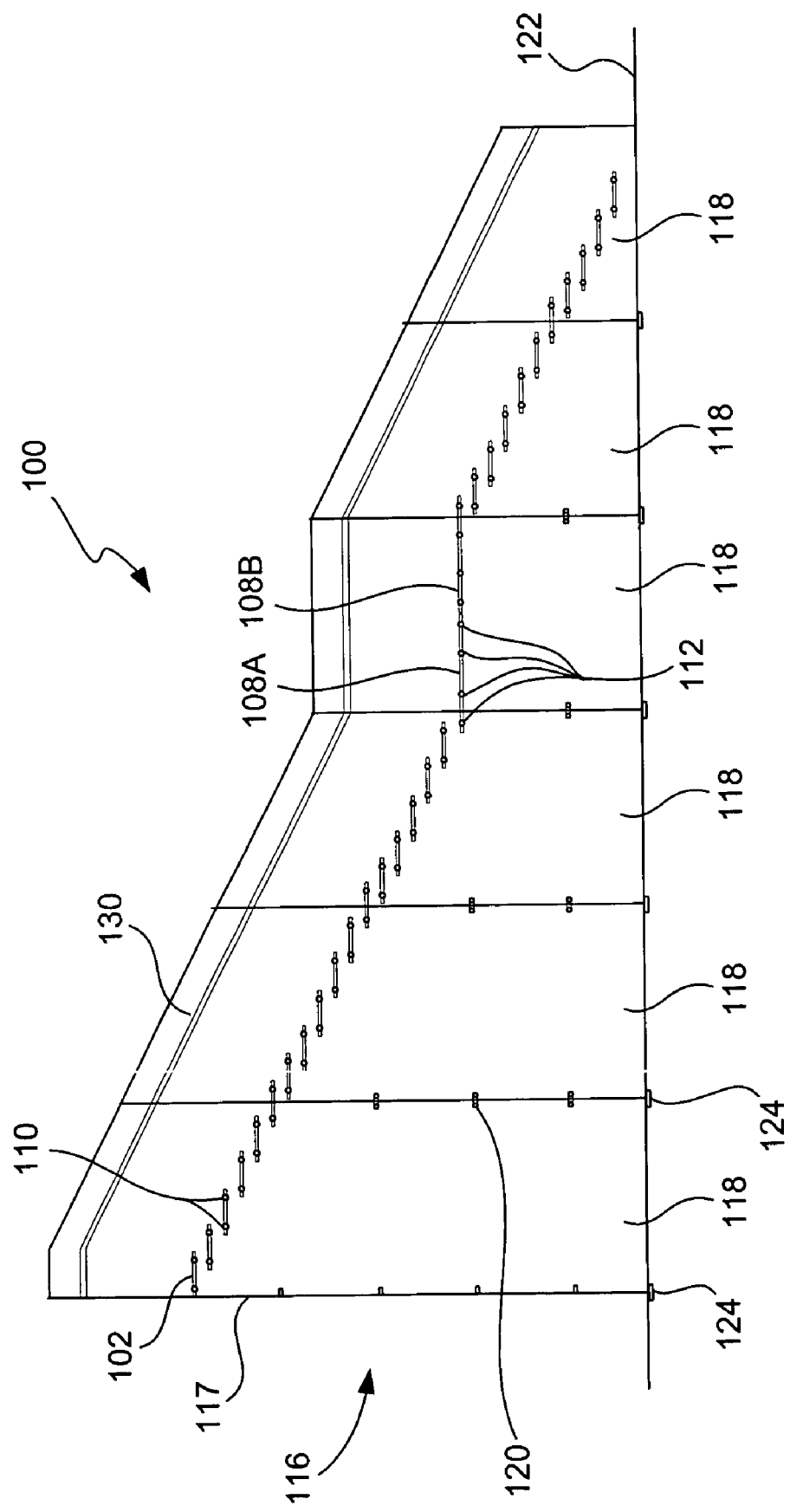
FIG. 3A is a side view diagram of a glass staircase, in accordance with one embodiment of the present invention.
Figure 3B:
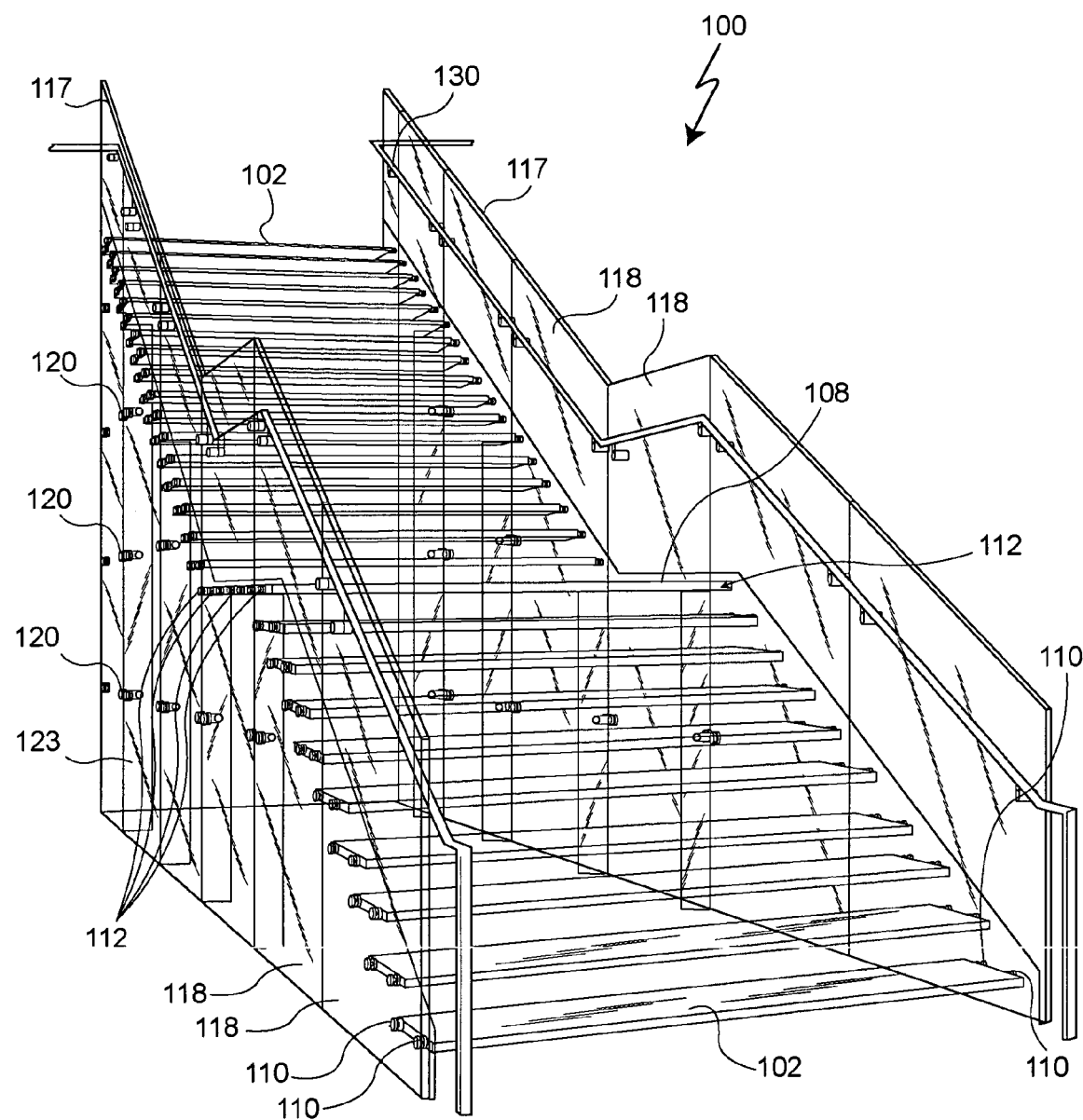
FIG. 3B is a perspective view diagram of a glass staircase, in accordance with one embodiment of the present invention.

FIG. 3A is a side view diagram of a glass staircase 100 and FIG. 3B is a perspective view diagram of the glass staircase 100, in accordance with one embodiment of the present invention. The glass staircase 100 is configured to provide a stairway (e.g., path) that connects one floor to another. The glass staircase 100 includes a flight or set of glass stairs 102 from the bottom to the top of the glass staircase 100. The glass stairs 102 generally consist of a tread, i.e., a horizontal member of the stair 102, and may or may not include a riser, i.e., a vertical member of the stair 102. In the illustrated embodiment, the stairs 102 only include a glass tread such that there is a vertical open space between each consecutive stair 102. The glass staircase 100 also includes a glass landing 108, which is a platform that interrupts the flight of stairs 102. As shown, the landing 108 is typically larger than an individual stair 102. The glass landing 108 may be a single piece or it may be a plurality of pieces. In the illustrated embodiment, the landing is formed from a first landing 108A and a second landing 108B which are parallel and adjacent one another. By way of example, the glass stair 102 as well as the glass landing 108 may generally correspond to the glass members 2 and 50 described in FIGS. 1 and 2. In most cases, each stair/landing is offset from the preceding stair or landing, thereby forming steps. Each step/landing generally overlaps a portion of the preceding stair or landing. By way of example, each step may overlap the preceeding step by about 4 inches (101.6 mm).

The stairs 102 and landing 108 are typically supported by a support structure 116 composed of spaced apart parallel structures 117 located on opposite sides of the stair 102 and landing 108. The structures 117 are configured to support the load of the stairs 102, landing 108 and any other component connected thereto, as well as any people walking thereon. The stairs 102 are generally connected to the structures 117 via stair connectors 110, and the landing 108 is generally connected to the structures 117 via landing connectors 112. By way of example, the stairs 102 and landing 108 may include inserts (not shown), which are configured to be coupled to the stair and landing connectors 110 and 112 in order to suspend the stairs 102 and landing 108 within the structures 117. In one embodiment, the stairs include a pair of inserts on opposing sides while each of the landings includes 4 inserts on opposing sides (e.g., generally need more inserts the wider the glass member). As should be appreciated, the stairs 102 and landings 108 span the entire distance between the two connection points without any other support structures, i.e., only supported at the ends of the span (not at the middle of the span as is done conventionally).

The structures 117 of the support structure 116 may be widely varied. They may formed by an existing wall, or they may be a free standing structure. Furthermore, they may be formed from a single piece or from a plurality of pieces. In the illustrated embodiment, each of the structures 117 is a free standing structure formed by a plurality of adjacent panels 118. The adjacent panels may be coupled to one another as well as to a floor using any suitable means. For example, the panels 118 may be connected to one another via one or more panel connectors 120, and they may be connected to a floor 122 via one or more floor connectors 124. To stiffen the panels 118, fins 123 may be positioned parallel to the tread and perpendicular to the panel, i.e., extend into the support structure. The panels 118 themselves may be widely varied. For example, they may be formed from a variety of materials. In the illustrated embodiment, the panels are formed from glass, and more particularly, from laminated glass. By way of example, they may be formed in a similar manner as the previously described glass members 2 and 50. The glass staircase 10 may also include a handrail 130 that can be grasped by a hand along the outer edge of the stairway.

Figure 4:
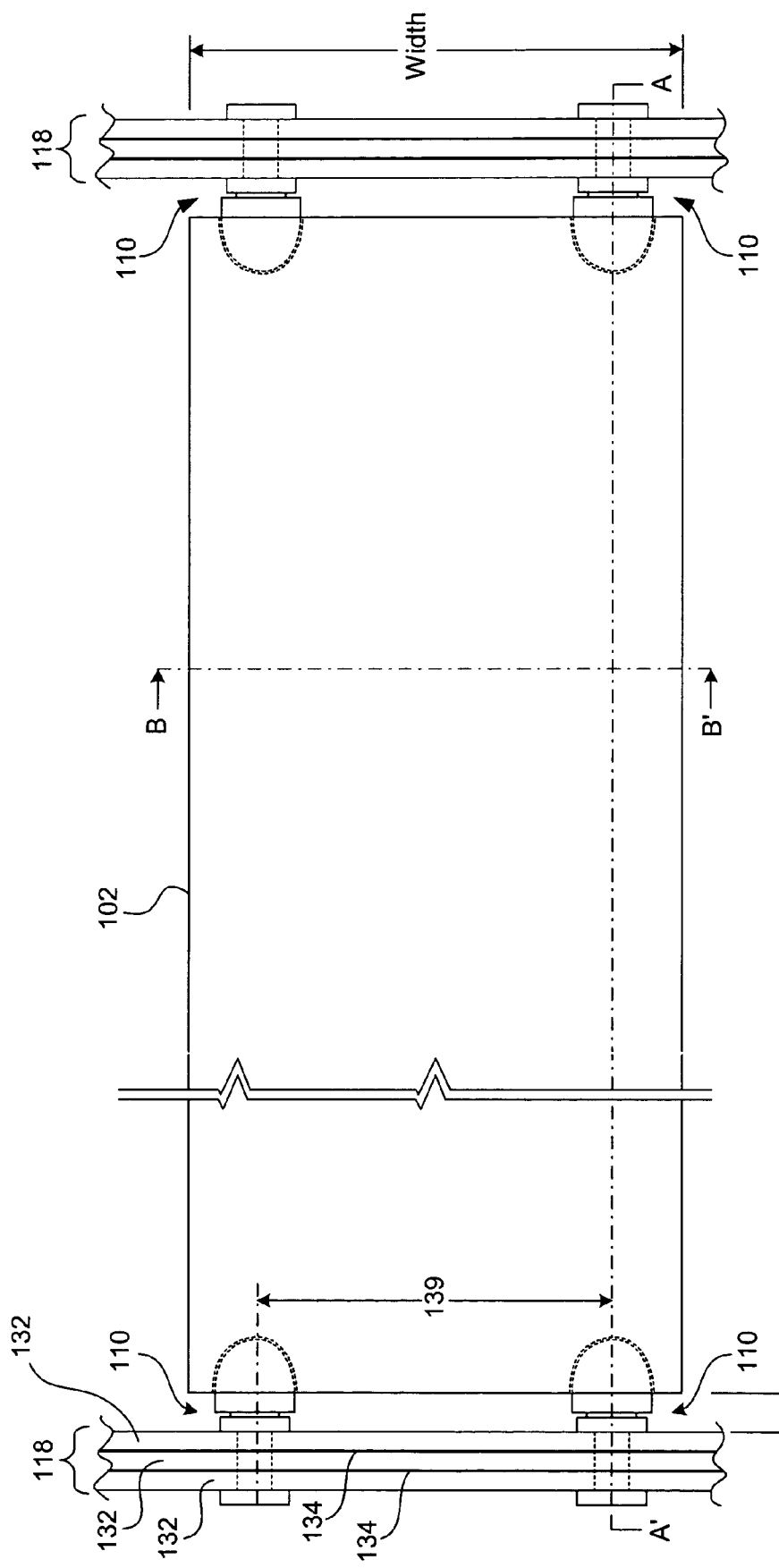
FIG. 4 is a top view of an individual glass stair connected between two glass panels, in accordance with one embodiment of the present invention.

FIG. 4 is a top view of an individual glass stair 102 connected between two glass panels 118, in accordance with one embodiment of the present invention. As shown, the glass stair 102 is connected to the glass panels 118 through a plurality of stair connectors 110. In particular, each end of the glass stair 102 is connected to its corresponding glass panel 118 via a pair of stair connectors 110. Each pair of stair connectors 110 is typically matched with a corresponding pair of inserts of the stair 102. The space 139 between the stair connectors, as well as the inserts, is generally configured to provide the greatest amount load carrying capacity to the stair 102. Each of the glass panels 118 may be widely varied. For example, it may be formed from one or more glass sheets 132. In the illustrated embodiment, the glass panels 118 are formed from a plurality of glass sheets 132. In particular, three glass sheets 132 are used to form the glass panels 118. The glass sheets 132 are typically bonded to one another via a bonding layer 134 interposed between each sheet 132. By way of example, the bonding layer may be PVB, Sentry Glas Interlayer, and the like.

In one embodiment, the glass panels are formed from three glass sheets formed from tempered glass, and the bonding layers is PVB. The thickness of each of the tempered glass sheets, as well as the PVB disposed therebetween may be widely varied. By way of example, an outer glass layer thickness of about 0.472 inches (12 mm), a middle glass layer thickness of about 0.472 inches (12 mm), an inner layer thickness of about 0.59 inches (15 mm) and a bonding layer thickness of about 0.06 inches (1.52 mm) may be used.

Furthermore, the connectors 110 form a spaced apart relationship between the edge of the stair 102 and the structures 118. By way of example, the stair may be spaced apart from the structures by about 1.213 inches (30.8 mm). Although shown spaced apart from the structures via the connectors, it should be noted that the stairs and landing may extend all the way to the sides of the structure if desired.

Figure 5:
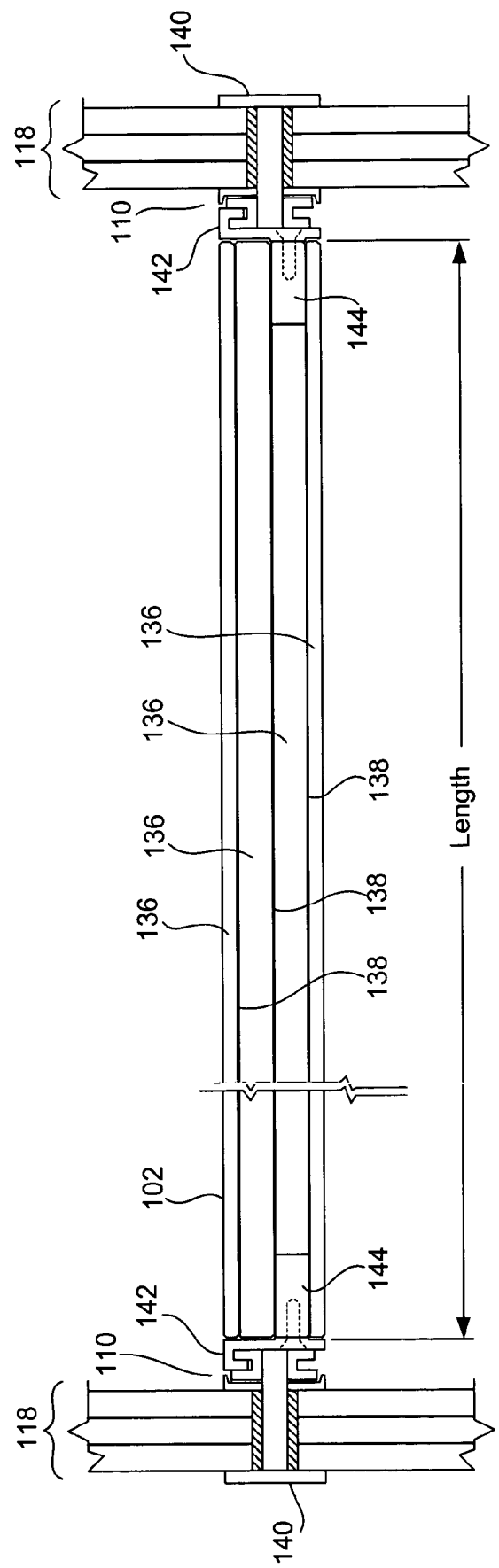
FIG. 5 is a front view of an individual glass stair connected between two glass panels, in accordance with one embodiment of the present invention.
Figure 6:
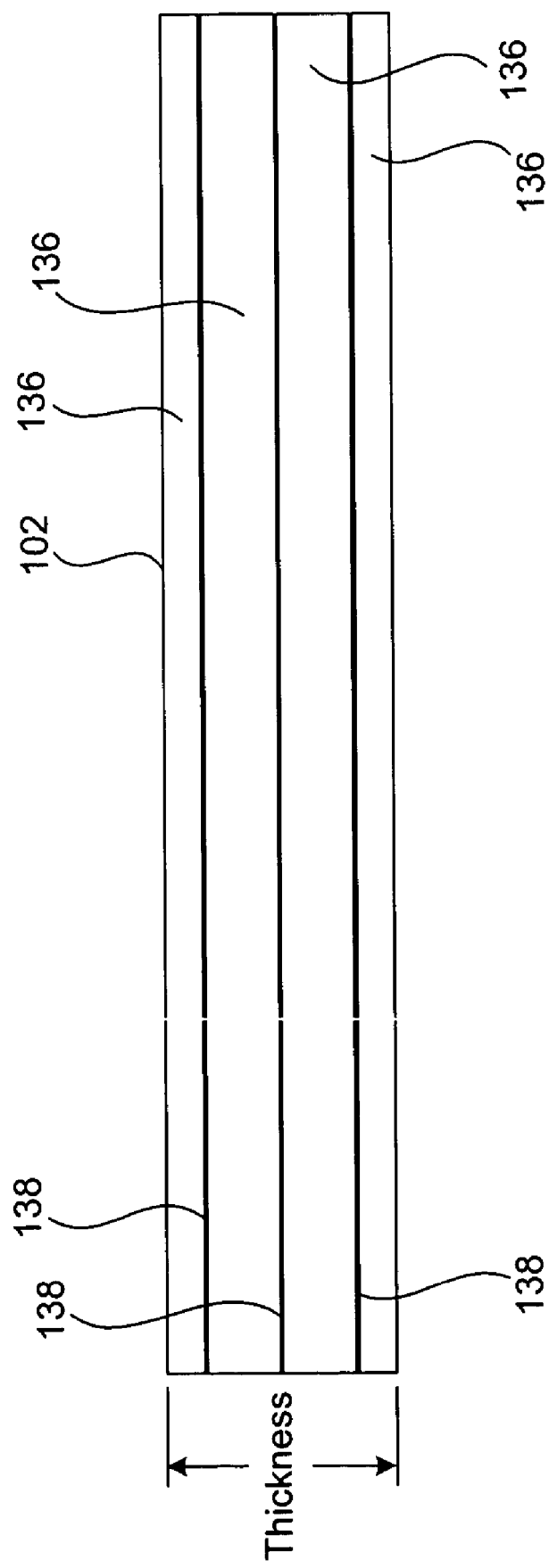
FIG. 6 is a side view of an individual glass stair, in accordance with one embodiment of the present invention.

Referring to FIGS. 5 and 6, the glass stair 102 will be described in greater detail. FIG. 5 is a side view of an individual glass stair 102 connected between two glass panels 118 (taken along line A–A'), in accordance with one embodiment of the present invention. FIG. 6 is a side view of an individual glass stair 102 (taken along line B–B'), in accordance with one embodiment of the present invention. As shown, the glass stair 102 may also be formed by one or more glass sheets 136. In the illustrated embodiment, the glass stairs 102 are formed from a plurality of glass sheets 136. In particular, four glass sheets 136 are used to form the glass stairs 102. The glass sheets 136 are bonded to one another via a bonding layer 138 interposed between each sheet 136. By way of example, the bonding layer may be Sentry Glas Interlayer, and the like. As such, the glass stair 102 is single composite member formed by a laminate structure of glass sheets and bonding layers. Furthermore, the stair connectors 110 typically include a first member 140, which is fixed to the glass panel 118, and a second member 142, which is fixed to the glass stair 102. The members 140, 142 may be fixed to their respective components using any suitable means. In one embodiment, the second member 142 is connected to an insert 144 that is disposed within the glass sheets 136 of the glass stair 102. The insert 144 is essentially part of the layered structure of the glass stair 102. As should be appreciated, the first and second members 140 and 142 are generally configured to couple to one another so as to hold the stair 102 in a secured and fixed position relative to the glass panels 118. The connection between the two members may be widely varied.

Referring to FIGS. 4–6, the overall dimensions of the stair are generally selected for aesthetic beauty and structural requirements. In one implementation, the overall length of the stair is about 7 ft 6.2 inches (2291.07 mm), the overall width is about 15 3/32 inches (383.4 mm) and the overall thickness is about 1.99 inches (50.56 mm).

The thickness of each of the various layers of the stair is also selected for aesthetic beauty and structural requirements. In one implementation, the top glass sheet has a thickness of about 0.315 inches (8 mm), the first intermediate glass sheet has a thickness of about 0.591 inches (15 mm), the second intermediate glass sheet has a thickness of about 0.591 inches (15 mm), the bottom glass sheet has a thickness of about 0.315 inches (8 mm) and the bonding layer has a thickness of about 0.60 inches (1.52 mm).

The dimensions of the inserts is also selected for aesthetic beauty and structural requirements. In one implementation, the insert has a width of about 2.186 inches (55.5 mm), a length of about 1.417 inches (36 mm), and a radius of about 1.043 inches (26.5 mm). Moreover, the cut out has a width of about 2.385 inches (60.57 mm), a length of about 1.586 inches (40.28 mm) and a radius of about 1.133 in (28.78 mm).

The position of the inserts is also selected for aesthetic beauty and structural requirements. For example, the centerline of the insert to the edge of the stair may be about 2 inches (50.8 mm) and the centerline of first insert to the centerline of second insert may be about 11 3/32 inches (281.8 mm).

The above described dimensions may be varied to form a landing. For example, the overall width may be about 3 ft 7 5/12 inches (1096.17 mm), the centerline of first and last insert to centerline of next insert may be about 11 1/8 inches (282.6 mm) and the centerline of next insert to the centerline of next insert may be about 7 1/16 inches (179.4 mm).

It should be noted that the dimensions mentioned above are not a limitation and that they may vary according to the specific needs of each glass member. For example, the dimensions may vary within ±5% of the given values.

Figure 7:
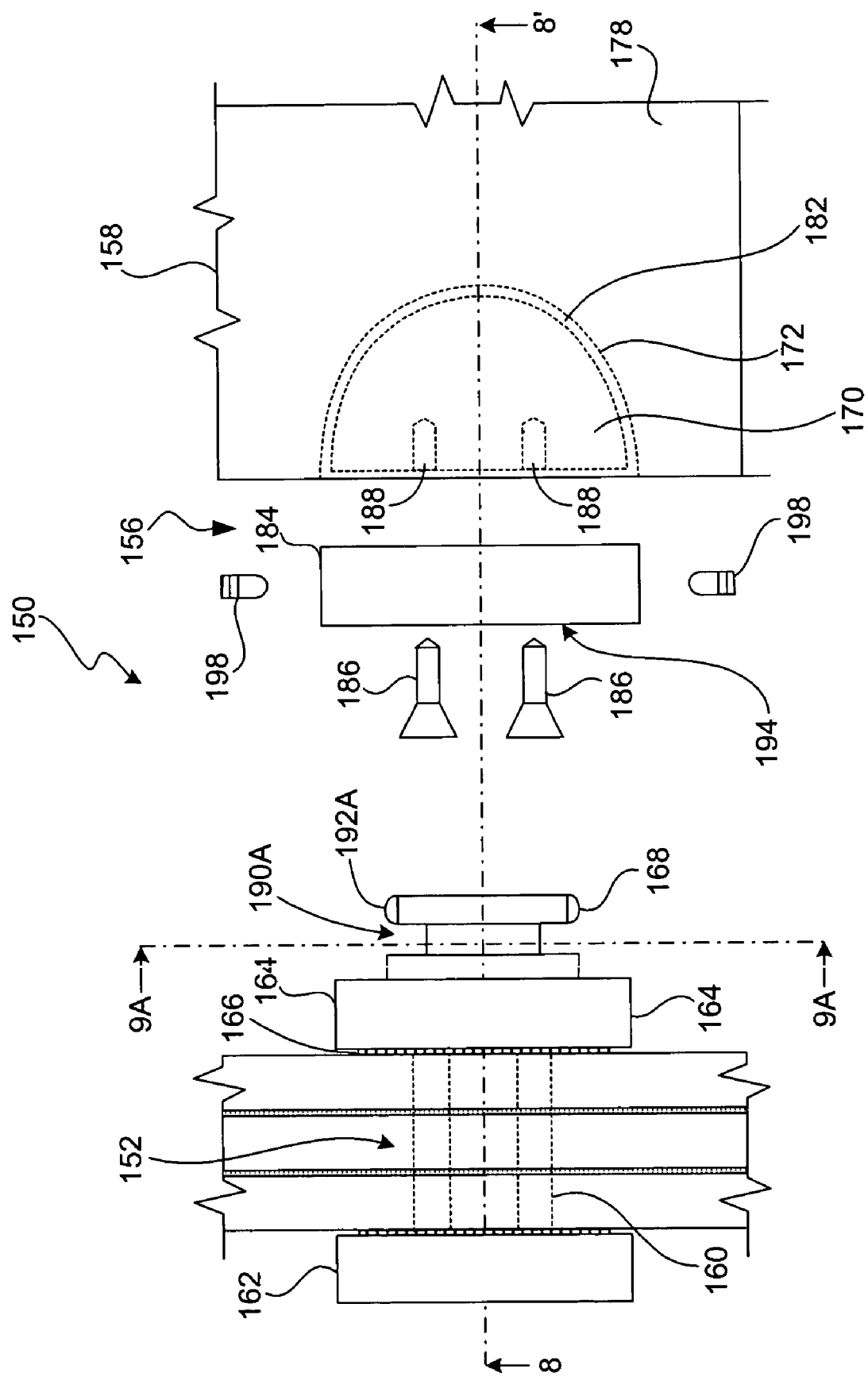
FIG. 7 is a top view of a broken apart connection arrangement, in accordance with one embodiment of the present invention.
Figure 8:
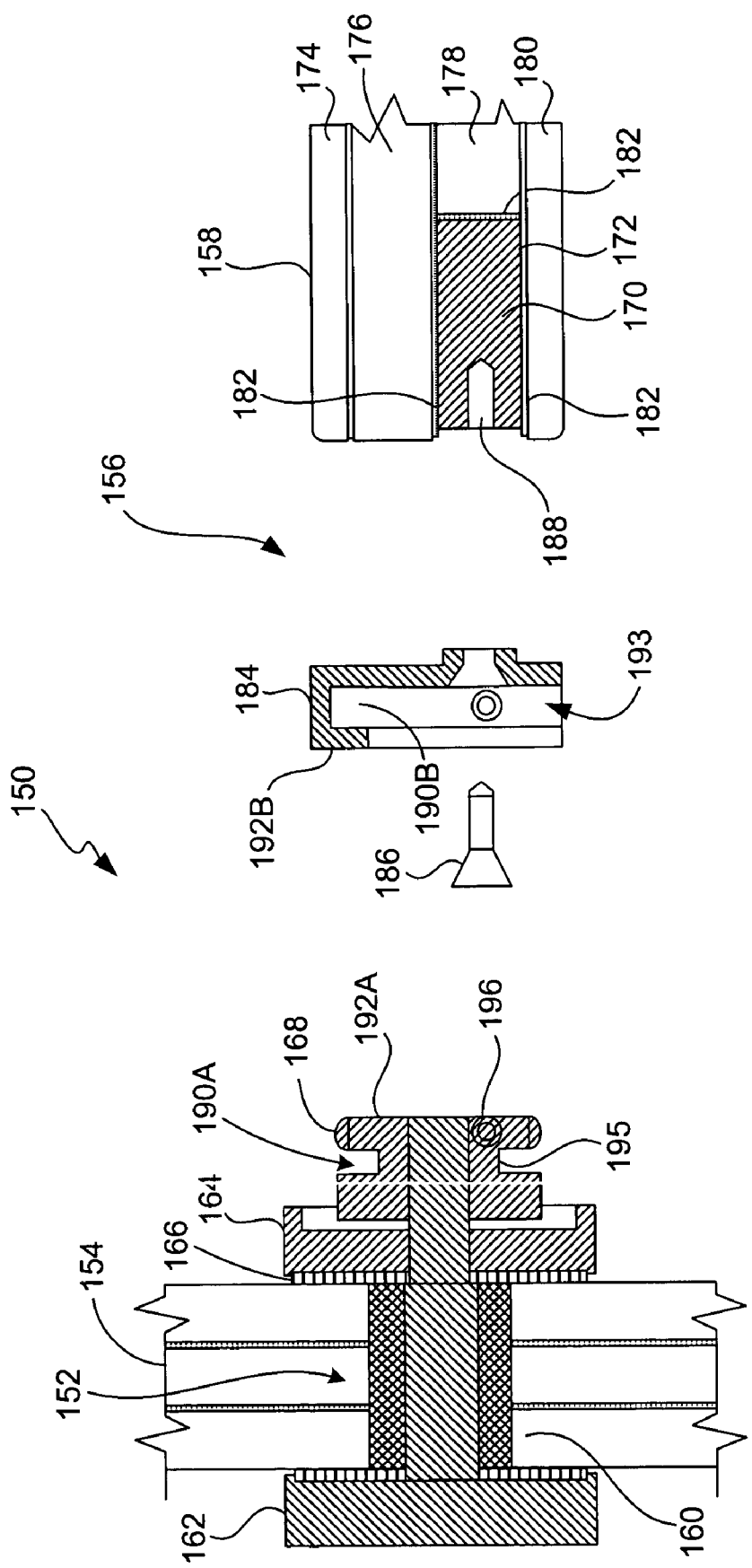
FIG. 8 is a front view of a broken apart connection arrangement, in accordance with one embodiment of the present invention.
Figure 9:
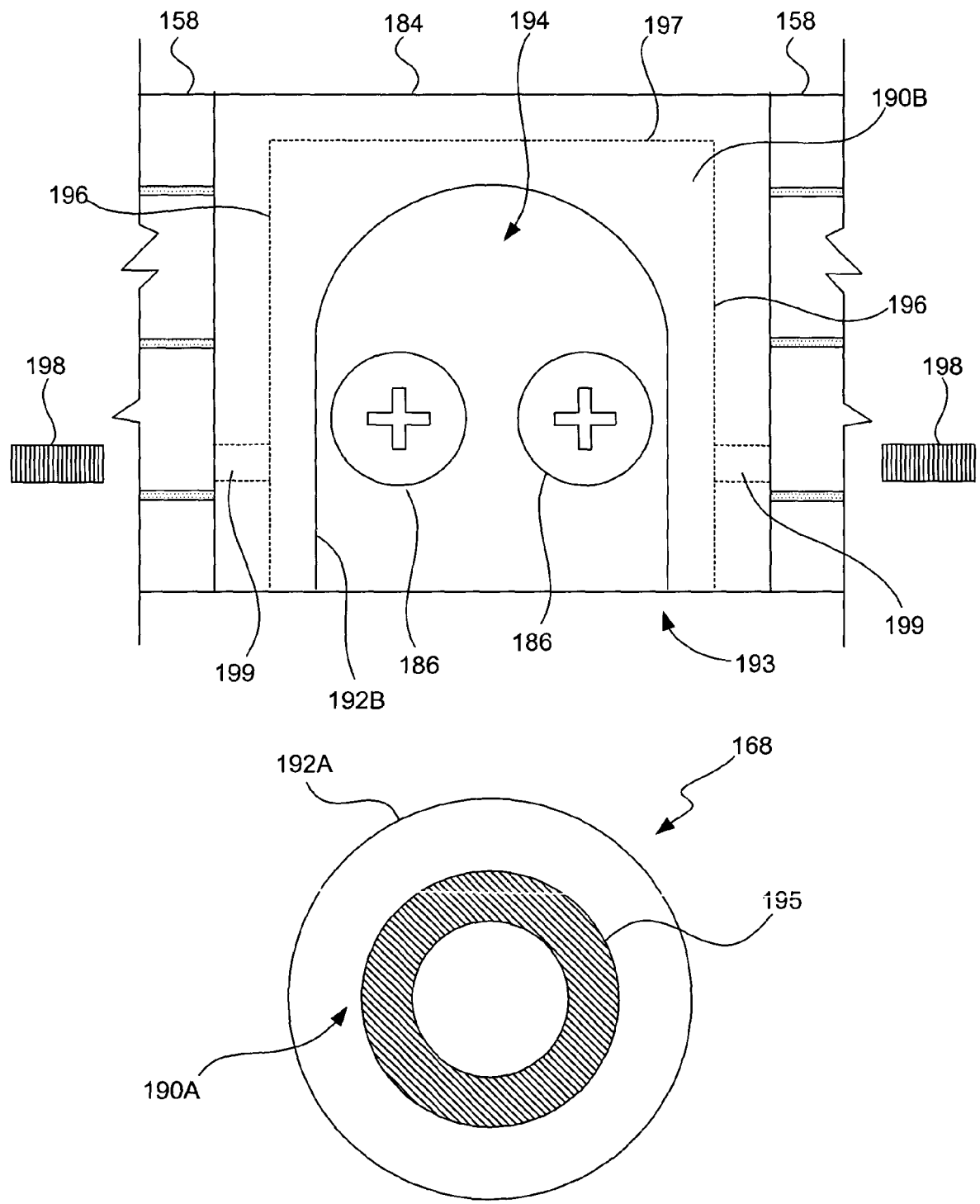
FIG. 9 is a side view of a broken apart connection arrangement, in accordance with one embodiment of the present invention.

FIG. 7 is a top view of a connection arrangement 150, FIG. 8 is a side view of the connection arrangement 150 (taken along line 8–8') and FIG. 9 is another side view of the connection arrangement 150 (taken along line 9–9'), in accordance with one embodiment of the present invention By way of example, the connection arrangement 150 may generally correspond to either the stair connectors 110 and/or landing connectors 112 shown in FIGS. 3–6. The connection arrangement 150 is generally formed by a first component 152 that is connected to a glass structure 154 (e.g., glass panel 118) and a second component 156 that is connected to a glass member 158 (e.g., glass stair 102 or landing 108). The first and second components 152 and 156 are configured to receive one another so as to place the glass member 158 in a desired position relative to the glass structure 154. That is, the first and second members 152 and 156 are configured to interlock with one another.

The first component 152 is generally disposed through an opening 160 in the glass structure 154. In most cases, the first component 152 includes locking portions 162 and 164, disposed on opposite sides of the glass structure 154, that secure the first member 152 to the glass structure 154. They may be secured to one another using any suitable means, as for example, screws, bolts, pins, snaps, welds, adhesives and the like. In the illustrated embodiment, they are secured via a threaded extension of the first component that is threadably received by the second component. One or more deformable washers 166 may be disposed between the locking portions 162, 164 and the glass structure 154 to soften the forces, which are typically exerted on the glass structure 154 by the secured locking portions 162, 164, i.e., so as to prevent cracking. The first component 152 also includes an interlocking portion 168 that is configured to be engaged with the second component 156 when the glass member 158 is connected to the glass structure 154. The interlocking portion 168 is typically fixed to one or both of the locking portions 162 and 164. As shown, the interlocking portion 168 extends away from the locking portion 164.

The second component 156 is generally interposed within the glass member 158 such that it is part of the glass member 158 (they are integrated into a single unit). In most cases, the second component 156 includes an insert 170 that is disposed between any two layers of the glass member 158 within a void of another layer. For example, as shown, the insert 170 is disposed inside a void 172 defined by a first intermediate layer 176 (top of void), a second intermediate layer 178 (sides of void), and a bottom layer 180 (bottom of void). The insert 170 is typically held in the void 172 with an adhesive or bonding agent. In the illustrated embodiment, the insert 172 is held in place (fixed) by a bonding layer 182, which is used to bond the various layers 174–180 of the glass member 158 together. The second component 156 also includes an interlocking portion 184 that is secured to the insert 172. They may be secured to one another using any suitable means, as for example, screws, bolts, pins, snaps, rivots, welds, adhesives, and the like. In the illustrated embodiment, the interlocking member 184 is secured to the insert 172 via one or more bolts or screws 186 (e.g., two) that are threadably received by one or more threaded openings 188 inside the insert 172. Alternatively, the insert 172 and interlocking member 184 may be formed from the same part, thus no securement means is necessary. The interlocking member 184 is configured to be engaged with the first component 152 when the glass member 158 is connected to the glass structure 154.

To elaborate, the interlocking portion 168 of the first component 152 is configured to interlock with the interlocking portion 184 of the second component 156. The means of interlocking may be widely varied. In the illustrated embodiment, each of the interlocking portions 168 and 184 includes channels 190A and B respectively and flanges 192A and B respectively. The flange 192A of the first interlocking portion 168 is received (e.g., inserted) by the channel 190B of the second interlocking portion 184, and the flange 190B of the second interlocking portion 184 is received by the channel 192A of the first interlocking portion 168 thus interlocking the two portions together. In most cases, the flanges 190 and channels 192 allow sliding engagement between the two interlocking portions 168 and 184 so that they may be interlocked with ease. The sliding engagement generally occurs vertically as the second interlocking portion 184 extends over the first interlocking portion 168. In particular, there is an opening 193 at the bottom of the second interlocking portion 184 through which the first interlocking portion 168 is inserted and a cut out section 194 at the side of the second interlocking portion 184 through which a neck 195 of the first interlocking portion 168 is inserted. Furthermore, the second interlocking portion 184 includes side walls 196 and an upper wall 197 that surround the outer periphery of the flange 192A of the first interlocking portion 168 when the first and second interlocking portions are engaged. The side walls typically prevent lateral movements while the upper wall typically rests on the top surface of the flange 192A of the first interlocking portion 168, i.e., the second interlocking portion 168 supports the first interlocking portion 184 thereon.

A suitable fastening means may be used to prevent the interlocking portions 168 and 184 from become "unlocked." By way of example, set screws 198, which are threadably received by one or more threaded openings 199 inside the second interlocking portion 184, may be used to secure the interlocking portions 168 and 184 in their interlocked position, i.e., the set screws may be positioned against a lower half of the first interlocking portion thereby preventing any vertically upward movement.

Figure 10:
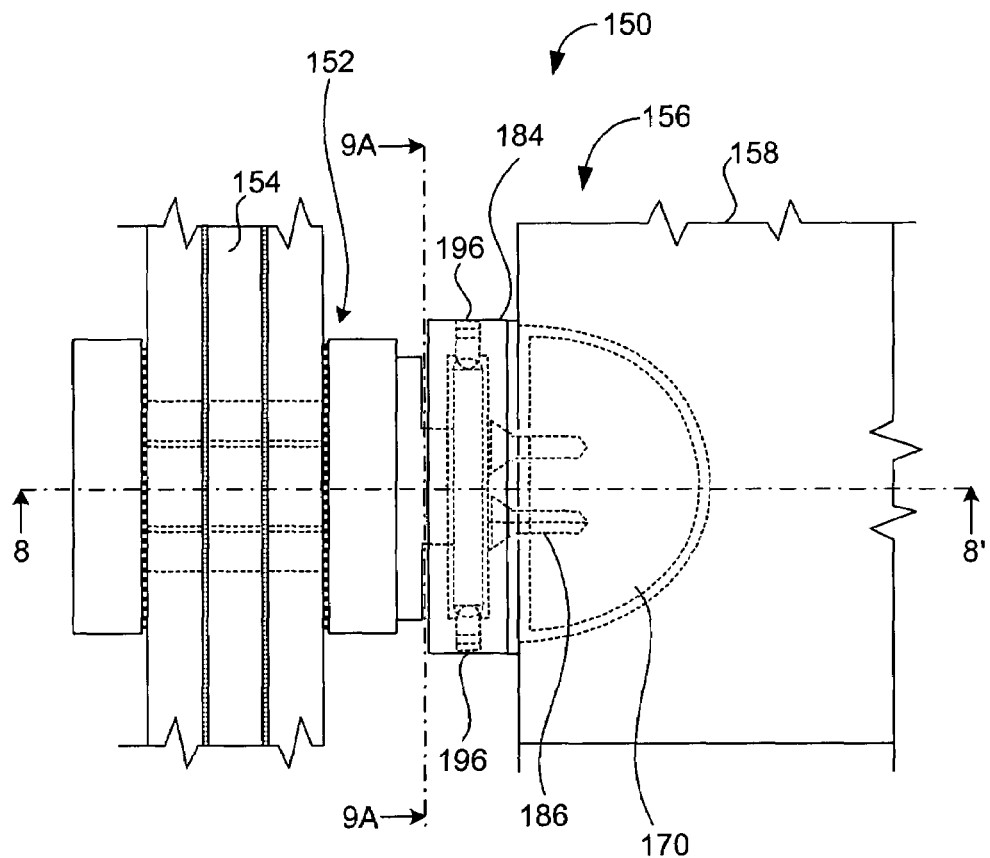
FIG. 10 is a top view of a connected connection arrangement, in accordance with one embodiment of the present invention.
Figure 11:
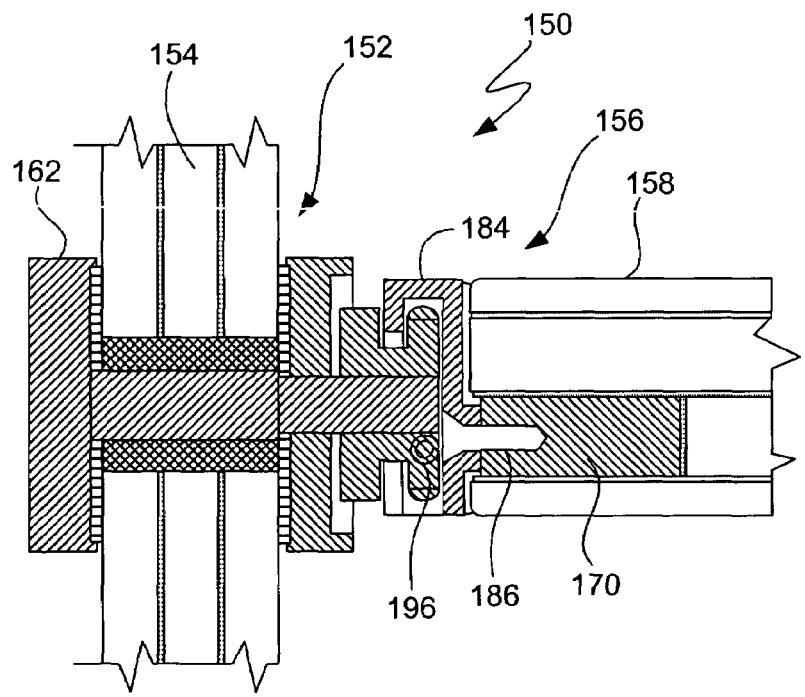
FIG. 11 is a front view of a connected connection arrangement, in accordance with one embodiment of the present invention.
Figure 12:
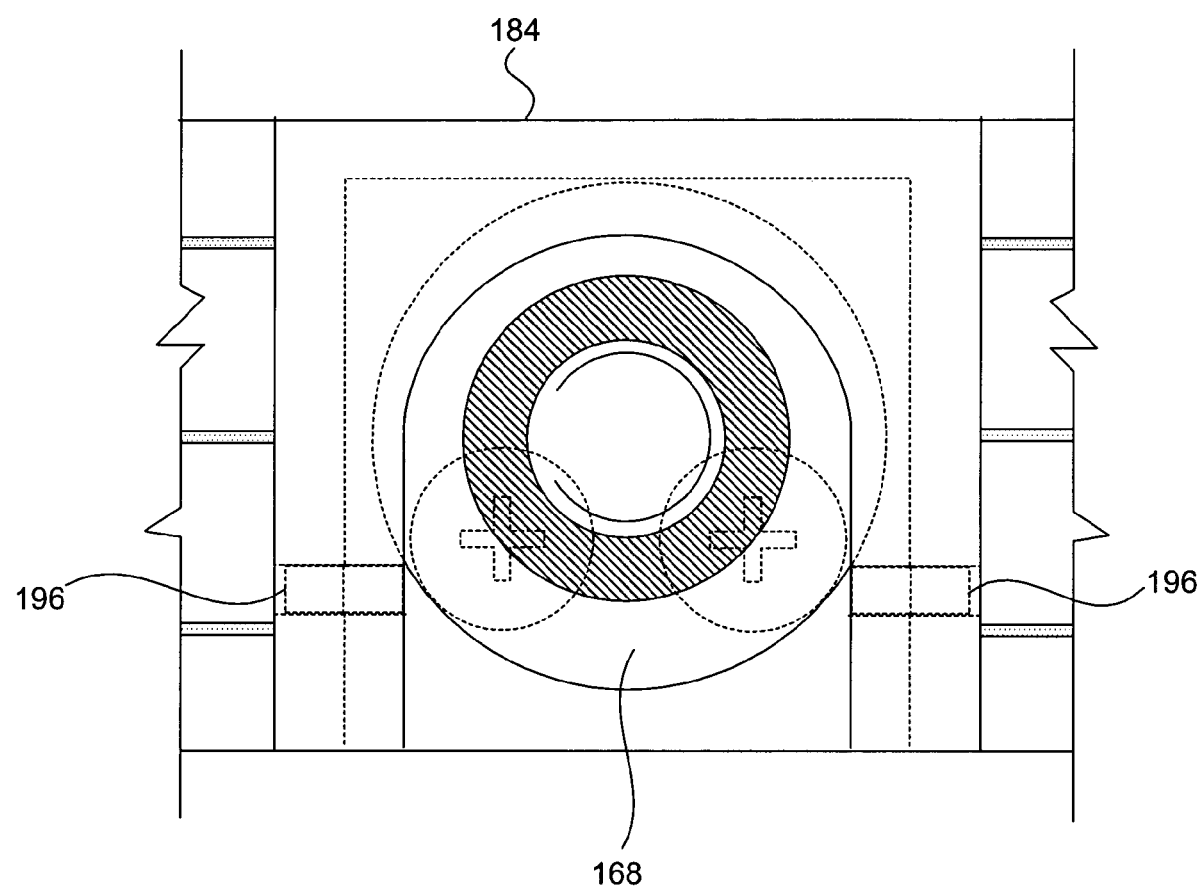
FIG. 12 is a side view of a connected connection arrangement, in accordance with one embodiment of the present invention.

Referring to FIGS. 10–12, the connection arrangement 150 will be described in greater detail. FIG. 10 is a top view of a connection arrangement 150, FIG. 11 is a side view of the connection arrangement 150 (taken along 8–8' in FIG. 10) and FIG. 12 is another side of the connection arrangement 150 (taken along 9–9' in FIG. 10), in accordance with one embodiment of the present invention. All these Figures show the connection arrangement 150 in its fully engaged position. As shown, the interlocking portion 184 of the second component 156 is secured to the insert 170 via screws 186. Furthermore, the two interlocking portions 168 and 184 are engaged with one another, i.e., the flanges 190 are inserted in the channels 192. Additionally, the set screws 196 are secured in place to keep the interlocking portions 168 and 184 "locked" together, i.e., set screws lock them together so that it cant move.

As should be appreciated, the first component 152 is configured to support the second component 156 thereon and thus it also supports the glass member 158 as well as any loads applied thereto. Because of their loading bearing nature, the first and second components 152 and 156 are generally formed from suitable load bearing materials. For example, they may be formed from any combination of metals such as steel, aluminum, titanium, and/or the like. In one particular embodiment, the insert 170 is formed from titanium while all the other components are formed from steel such as stainless steel.

In one embodiment, the interlocking portions 168 and 184 are built with tolerance gaps therebetween so as to allow for deviations that may occur in the interconnecting parts. Silicon may be disposed within the tolerance gaps, as well as any other gaps formed between the parts. For example, between the interlocking portion 184 of the second component 156 and the side of the laminated glass member 158, between the channels 192 and the flanges 190, and the like.

While this invention has been described in terms of several preferred embodiments, there are alterations, permutations, and equivalents, which fall within the scope of this invention. For example, the invention discussed above may be used in other industries un-related to the architectural field (which uses the glass members for bridges, stairs and the like). In one embodiment, the invention described herein may be used in forming housings for electronic devices such as computer devices. By way of example, the housing may be associated with a general purpose computer such as a laptop or desktop computer. In most cases, housings include one or more walls that serve to structurally support the internal components in their assembled position within the housings. The walls also define the shape or form of the housings, i.e., the contour of the walls embody the outward physical appearance of the housings. The invention described herein may be used to form one or more walls of a computer housing or it may be used to form a window in one or more walls of the computer housing. The glass member of the invention, in particular, may allow the distribution of light therethrough or it may provide transparency for allowing the internal components of the computer to be viewed from the outside. The glass member may be clear or frosted. When used as a component of a housing, the invention described herein is particularly useful in U.S. patent application Ser. No. 10/075,964, titled "ACTIVE ENCLOSURE FOR COMPUTING DEVICE," filed on Feb. 13, 2002, and U.S. patent application Ser. No. 10/075,520, titled "COMPUTING DEVICE WITH DYNAMIC ORNAMENTAL APPEARANCE," filed on Feb. 13, 2002, both of which are herein incorporated by reference.

It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A staircase, comprising;
   a pair of spaced apart vertical walls;
   a plurality of horizontal glass treads positioned between the spaced apart vertical walls in a stepped apart relationship relative to one another, each of the glass treads having opposing ends;

a plurality of connection arrangements for fixing the opposing ends of the horizontal glass treads to the spaced apart vertical walls, each of the connection arrangements including a first connection member that is adapted to be fixed to the vertical wall and a second connection member adapted to be fixed to the end of the glass horizontal tread, the first connection member having a first interlocking portion, the second connection member having a second interlocking portion, the first and second interlocking portions being configured to engage one another so as to place the horizontal glass tread in a secure relationship relative to the vertical walls.

2. The staircase as recited in claim 1 wherein the vertical walls are formed from glass.

3. The staircase as recited in claim 2 wherein the vertical walls and horizontal glass treads are laminated glass structures.

4. The staircase as reeked in claim 3 wherein the vertical walls are formed from a first laminated glass structure and wherein the horizontal glass tread is formed from a second laminated glass structure that is different than the first laminated glass structure.

5. The staircase as recited in claim 1 wherein the horizontal glass tread is a laminated glass structure, wherein the second connection member includes an insert that is disposed within the laminated glass structure at each of its opposing ends, and wherein the second interlocking portion is coupled to the insert.

6. The staircase as recited in claim 5 wherein the horizontal glass member includes a plurality of glass sheets, one of the glass sheets having a first cut out at a first end of the horizontal glass member and a second cutout at a second end of the horizontal glass member, and wherein the second connection member includes a first insert disposed in the first cut out of the one glass sheet and a second insert disposed in the second cut out of the one glass sheet, the inserts being exposed at the ends of the horizontal glass member, the inserts providing a means for coupling the second interlocking portions to the horizontal glass member and wherein a bonding layer is disposed between adjacent pairs of glass sheets, the bonding layer being configured to bond the glass sheets and the inserts together to form a laminated structure and to provide rigidity and stiffness to the laminated structure.

7. The staircase as recited in claim 6 wherein the glass sheets are annealed glass sheets.

8. The staircase as recited in claim 6 wherein the bonding layer is a polymer.

9. The staircase as recited in claim 6 wherein the bonding layer is Sentry Plus Ionplast Interlayer.

10. The staircase as recited in claim 6 wherein the glass sheets have a low concentration of iron.

11. The staircase as recited in claim 6 wherein the connector is formed from titanium.

12. The staircase as recited in claim 6 wherein the horizontal glass member spans from the first end to the second end a length of between about 7 and about 8 feet.

13. The staircase as recited in claim 6 wherein the horizontal glass member supports loads from foot traffic of one or more persons.

14. The staircase as recited in claim 6 wherein the glass member includes four glass sheets and three bonding layers.

15. The staircase as recited in claim 6 wherein the one glass sheet includes two or more cut outs at the first end and two or more cutouts at the second end and further including inserts disposed in each of the cut outs of the one glass sheet, all of the inserts being exposed at the ends of the horizontal glass member, and providing a means for coupling the second interlocking portions to the horizontal glass member.

16. The apparatus of claim 6 wherein the inserts are formed from titanium.

17. The apparatus of claim 16 wherein the first and second interlocking portions arc formed from stainless steel.

18. The staircase as recited in claim 1 wherein the interlocking portions are configured to disengage from one another so as to place the horizontal glass tread in a removable relationship relative to the vertical walls.

19. The staircase as rectal in claim 1 wherein the horizontal glass tread is only supported at the first and second ends thereof by the first and second connection members.

20. The staircase as recited in claim 1 wherein the horizontal glass treads of the staircase, comprise a plurality of glass sheets that are bonded together to form a laminate structure, the laminate structure being configured to support human loads that are applied normal to a top surface of the laminate structure.

21. The staircase as recited in claim 1 wherein the second connection member is interposed within the glass horizontal tread such that the second connection member and the glass horizontal tread are an integral unit.

22. A glass staircase, comprising:

a support structure composed of spaced apart parallel wafts, each of the spaced apart parallel walls including a plurality of side by side upwardly rising panels formed from glass and connected together; and a plurality of upwardly rising stepped stairs, each stair only including a horizontal tread formed from glass, each horizontal tread partially overlapping a portion of a preceding horizontal tread such that there is a vertical open space between each consecutive stair, a first end of the horizontal treads being connected to a first wall of the spaced apart parallel walls, a second end of the horizontal treads being connected to a second wall of the spaced apart parallel walls, the horizontal treads only being supported at the first and second ends by the first and second walls.

23. The staircase as recited in claim 22 further including a glass landing disposed in the middle of the of the upwardly rising stepped stairs.

24. The staircase as recited in claim 22 wherein the ends of the panels of each of the spaced apart parallel walls are connected together with one or more connectors.

25. The staircase as recited in claim 22 wherein the first and second ends of the horizontal treads include a pair of first connectors, wherein the panels of the spaced apart parallel walls include a pair of second connectors cooperatively positioned relative with the first connectors, and wherein the first and second connectors interlock with one another to secure the horizontal treads to the panels of the of the spaced apart parallel walls.

26. The staircase as recited in claim 25 wherein the second connectors are interposed within the horizontal tread such that the second connectors and the horizontal treads are an integral unit.

27. The staircase as recited in claim 25 wherein first and second connectors when interlocked form a gap between the horizontal tread and the panel.

* * * * *

UNITED STATES PATENT AND TRADEMARK OFFICE
CERTIFICATE OF CORRECTION

PATENT NO. : 7,165,362 B2 Page 1 of 1
APPLICATION NO. : 10/616065
DATED : January 23, 2007
INVENTOR(S) : Jobs et al.

It is certified that error appears in the above-identified patent and that said Letters Patent is hereby corrected as shown below:

In the Claims:

In line 1 of claim 4 (column 13, line 21) change "reeked" to --recited--.

In line 2 of claim 17 (column 14, line 11) change "arc formed" to --are formed--.

In line 1 of claim 19 (column 14, line 16) change "rectal" to --recited--.

In line 3 of claim 22 (column 14, line 31) change "wafts" to --walls--.

Signed and Sealed this

Sixteenth Day of October, 2007

JON W. DUDAS
*Director of the United States Patent and Trademark Office*